June 23, 1931. J. R. GROVE 1,811,007
VENDING MACHINE
Filed Aug. 21, 1928 9 Sheets-Sheet 2
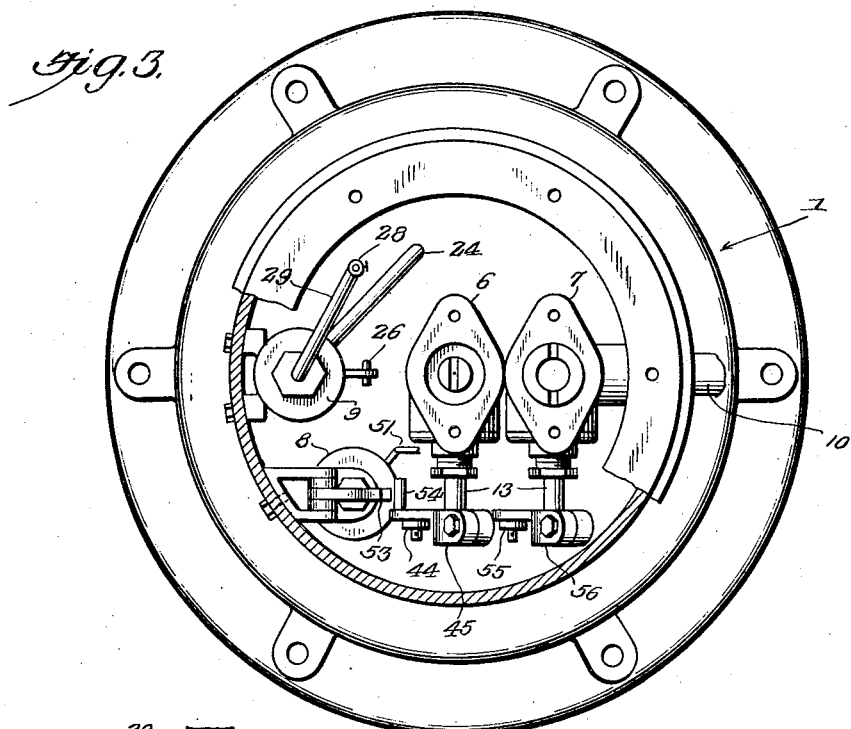
Fig. 3.
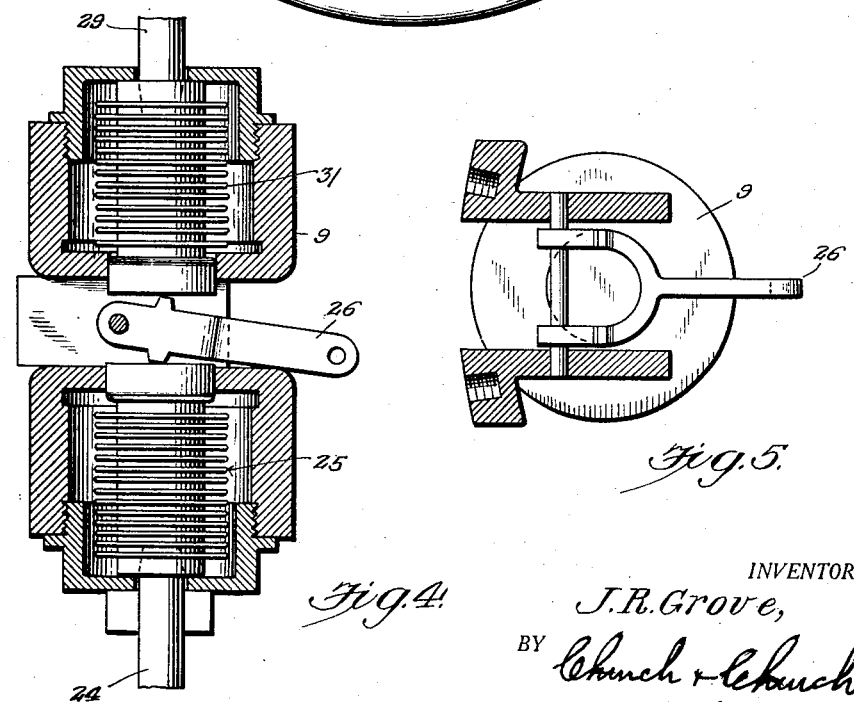
Fig. 4.
Fig. 5.
INVENTOR.
J. R. Grove,
BY Church & Church
his ATTORNEYS

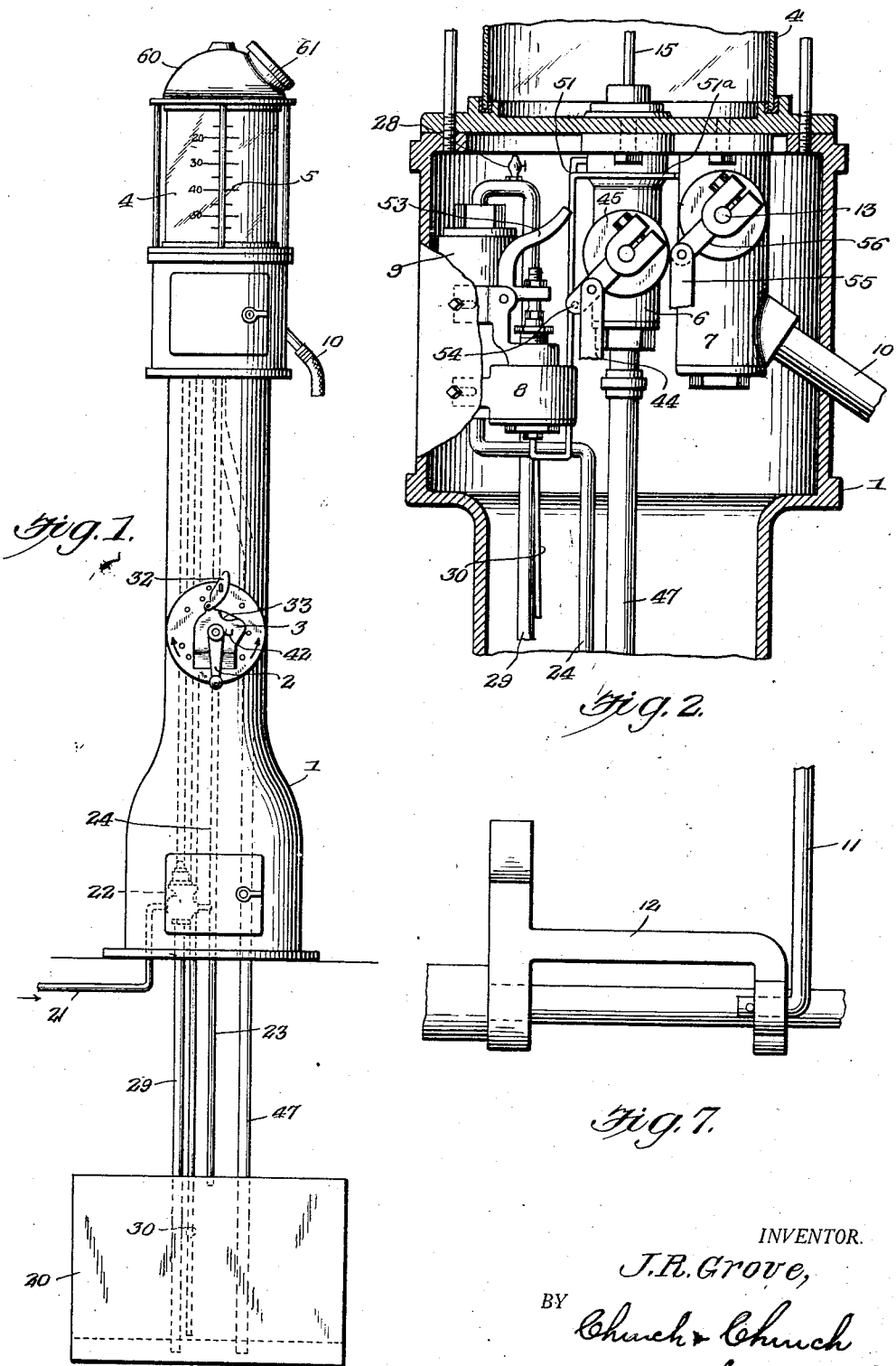

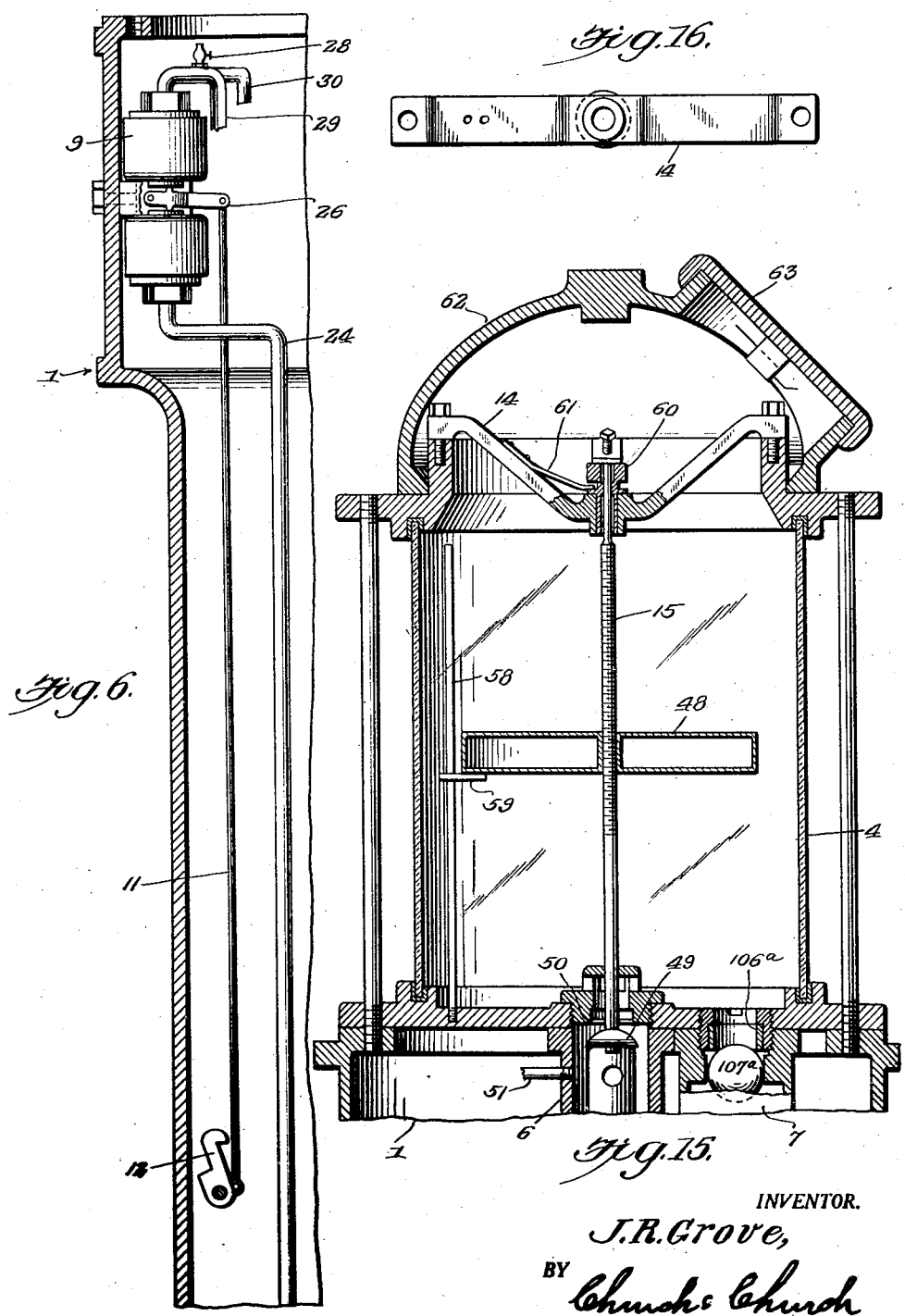

INVENTOR.
J. R. Grove,
BY Church & Church
his ATTORNEYS

June 23, 1931. J. R. GROVE 1,811,007
VENDING MACHINE
Filed Aug. 21, 1928  9 Sheets-Sheet 5

INVENTOR.
J. R. Grove,
BY Church & Church
his ATTORNEYS

June 23, 1931.  J. R. GROVE  1,811,007

VENDING MACHINE

Filed Aug. 21, 1928  9 Sheets-Sheet 6

INVENTOR.
J. R. Grove,
BY Church & Church
his ATTORNEYS.

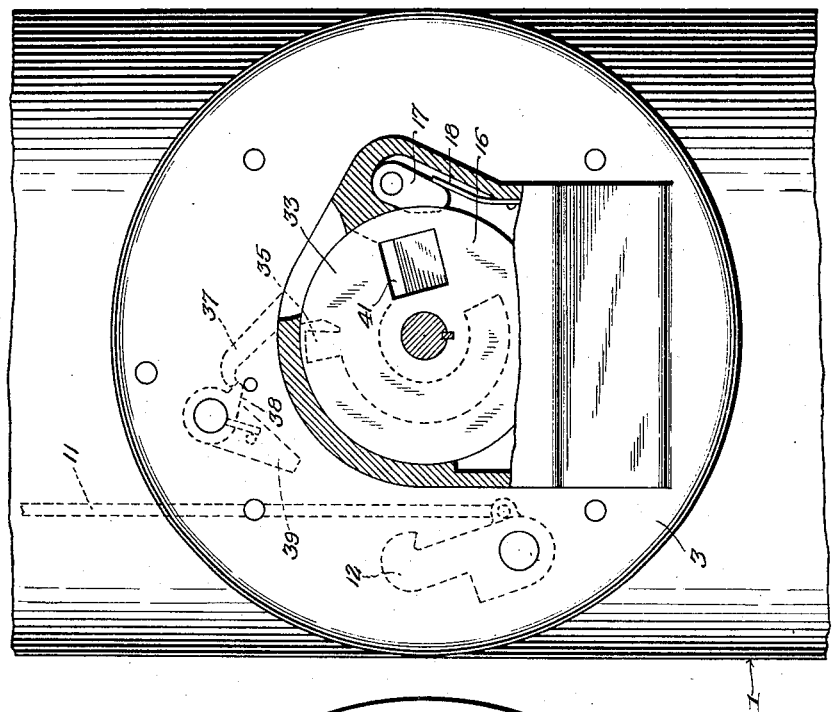

June 23, 1931.                J. R. GROVE                1,811,007
                             VENDING MACHINE
                   Filed Aug. 21, 1928      9 Sheets-Sheet 8
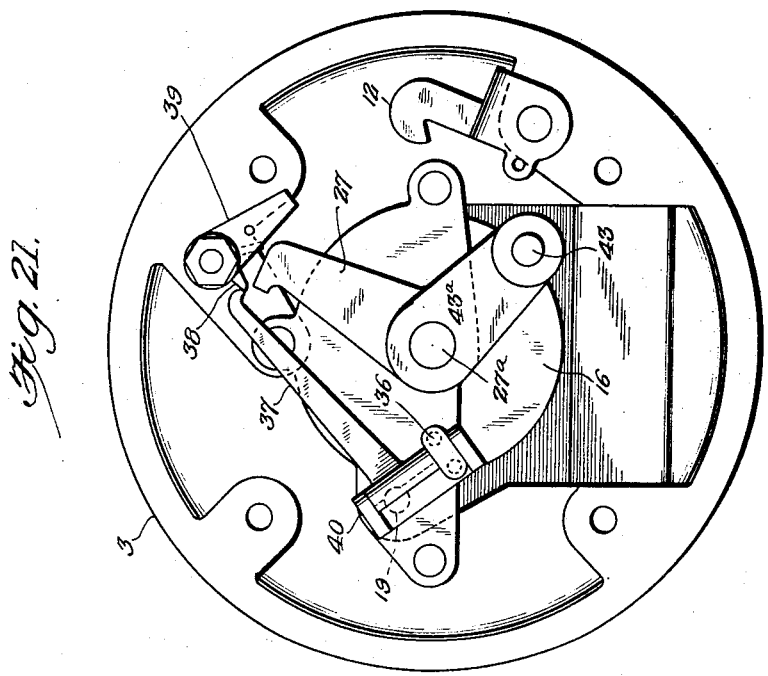
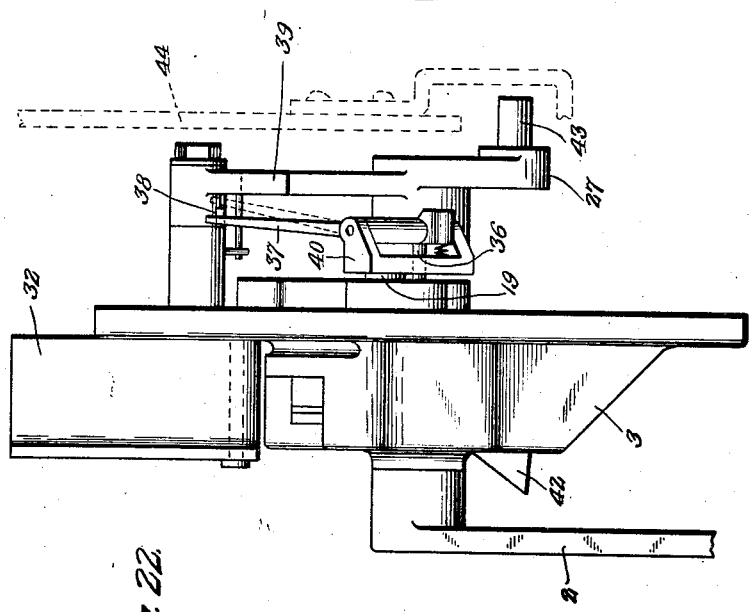
INVENTOR.
J. R. Grove,
BY Church & Church
ATTORNEYS.

June 23, 1931. J. R. GROVE 1,811,007
VENDING MACHINE
Filed Aug. 21, 1928 9 Sheets-Sheet 9
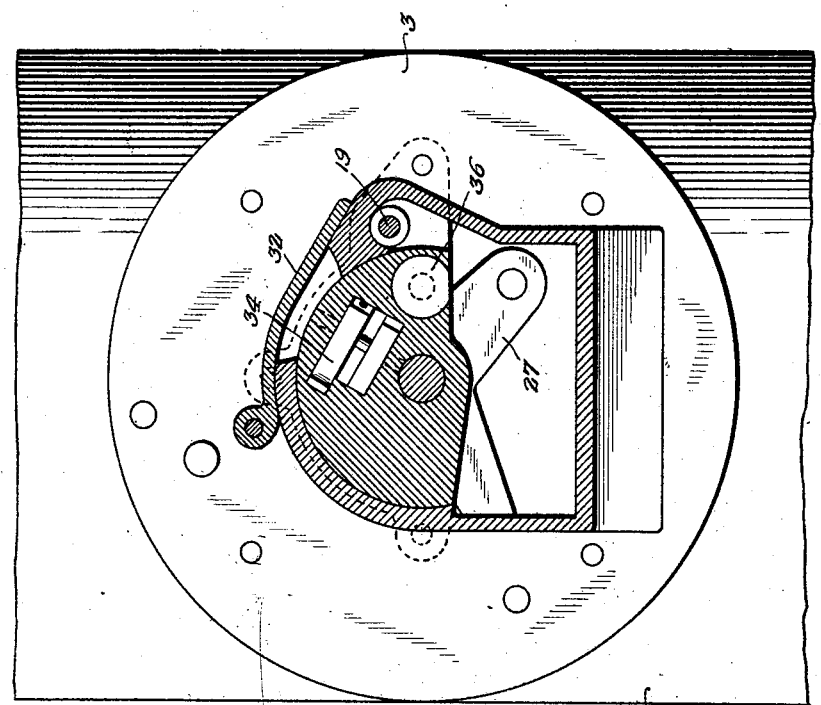
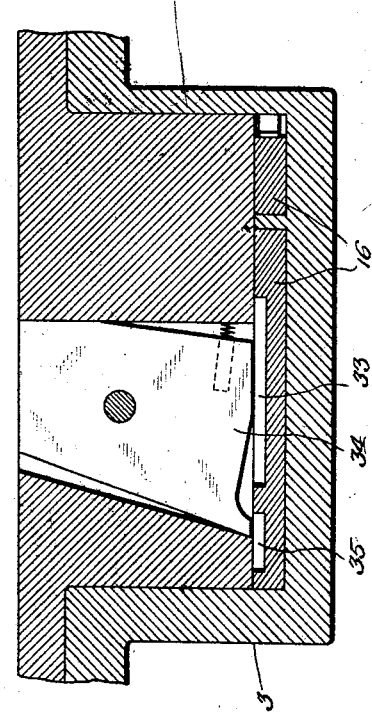
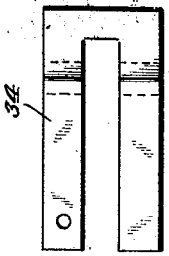
INVENTOR.
J. R. Grove,
BY Church & Church
his ATTORNEYS.

Patented June 23, 1931

1,811,007

UNITED STATES PATENT OFFICE

JACOB ROSS GROVE, OF YORK, PENNSYLVANIA, ASSIGNOR TO JACOB ROSS GROVE, TRUSTEE, IN TRUST FOR SAID JACOB ROSS GROVE, AND CHARLES B. WOLF, OF MOUNT WOLF, PENNSYLVANIA

VENDING MACHINE

Application filed August 21, 1928. Serial No. 300,987.

This invention relates to improvements in vending machines, and particularly to a coin controlled gasoline or other liquid vending machine or pump.

The present pump or machine is of a type adapted to be installed at more or less isolated points along highways so as to be available to motorists whose fuel supply might become depleted at times when they would ordinarily be unable to obtain additional supplies except from some remote point. In view of the fact that the apparatus is one adapted to be installed along highways, one object of the invention is to have the same controlled entirely in its operation by the insertion of a proper coin so that the presence of an attendant is unnecessary. The absence of any attendant for the apparatus naturally requires that there be means for preventing operation of the device if the fuel supply therefor has been depleted so that the motorist can not insert a coin and actuate the pump in the event that there is no fuel in the pump. In addition to providing such locking means, the invention also contemplates means for detecting spurious coins or the like, whereby gasoline, or other liquid being dispensed, can not be fraudulently obtained from the pump.

The apparatus is of rather conventional form in that it embodies a visible measuring container which the motorist can see at all times and to which fuel purchased by the motorist is supplied from a protected reservoir wherein the fuel is kept under pressure sufficient to feed it from said reservoir to said visible measuring container upon deposit of the proper coin and the subsequent operation of the operating handle by the motorist. In connection with this supply of fuel from the reservoir to the visible measuring container, the invention also contemplates the provision of means for locking the operating mechanism temporarily against operation by the motorist after he has deposited his coin and opened the valve which controls the flow from the reservoir to the measuring container. The operating mechanism is maintained in this locked position until the quantity of fuel that should be delivered to the motorist for the coin inserted by him has passed from the reservoir into the measuring container, whereupon said locking means are automatically rendered inoperative. However, before the motorist can withdraw the gasoline from the measuring container to place the same in the tank of his car, the valve controlling the flow of gasoline from the reservoir to the measuring container must be closed so that the motorist is insured of obtaining the quantity of fuel paid for but, at the same time, he will be unable to obtain more than that quantity of fuel.

A further object of the invention is the provision of means whereby the quantity of gasoline or other liquid delivered from the machine may be readily regulated. The machine is adapted for operation by one coin only, and as the price of gasoline fluctuates, it is necessary that the apparatus be capable of adjustment to meet this condition. Accordingly means are provided whereby the quantity of liquid delivered by the apparatus on each operation is controlled by means that are readily adjusted to vary that quantity, depending upon the relation of the value of the liquid with respect to the coin used in the apparatus. It will be understood, of course, that these adjustable means are accessible only to an authorized person so that after an adjustment is made, the apparatus will continue to dispense a fixed quantity on each operation until the duly authorized person makes another adjustment to compensate for a price fluctuation.

With these and other objects in view, the invention consists in certain novel details of construction, and combinations and arrangements of parts, all as will be hereinafter more fully described and the novel features thereof particularly pointed out in the appended claims.

In the accompanying drawings,

Figure 1 is an elevational view of the pump or apparatus showing the housing column, operating handle, and coin receiver, together with a diagrammatical illustration of the reservoir and the connections for supplying the fuel, together with connections for delivering the fuel from the reservoir to the visible measuring container;

Fig. 2 is a vertical sectional view through the upper portion of the housing column illustrating the inlet and outlet valves for the measuring container and a portion of the locking devices for locking the entire apparatus against operation upon depletion of the fuel supply and for locking the inlet valve in open position to insure the proper quantity of fuel being delivered to the measuring container from the reservoir;

Fig. 3 is a plan view of the parts illustrated in Fig. 2;

Figs. 4 to 7 are detail views illustrating the locking devices for preventing operation of the apparatus in the absence of proper fuel supply in the reservoir;

Fig. 15 is a vertical sectional view through the visible container mounted at the upper end of the housing column;

Fig. 16 is a detail view of the supporting bracket for the float in the measuring container;

Fig. 17 is a sectional view through the housing column showing the operating handle, a portion of the valve actuating connections, and the coin controlled devices for locking and releasing said operating handle;

Fig. 18 is a transverse sectional view through the housing column showing, for plan, the parts illustrated in Fig. 17;

Fig. 19 is a view taken from the exterior of the housing column showing, partly in section and partly in dotted lines, the handle locking devices;

Fig. 20 is an elevational view taken from the reverse side of the structure illustrated in Fig. 19, the parts being shown in the positions they normally occupy;

Fig. 21 is a similar view, illustrating the positions of the same parts occupied by them after the proper coin has been inserted and the inlet valve opened to permit the flow of fuel from the reservoir to the measuring container;

Fig. 22 is an elevational view taken at right angles to Fig. 21; and

Figs. 23 to 25 are detail views, partly in section, illustrating the coin detecting devices.

Figure 8:
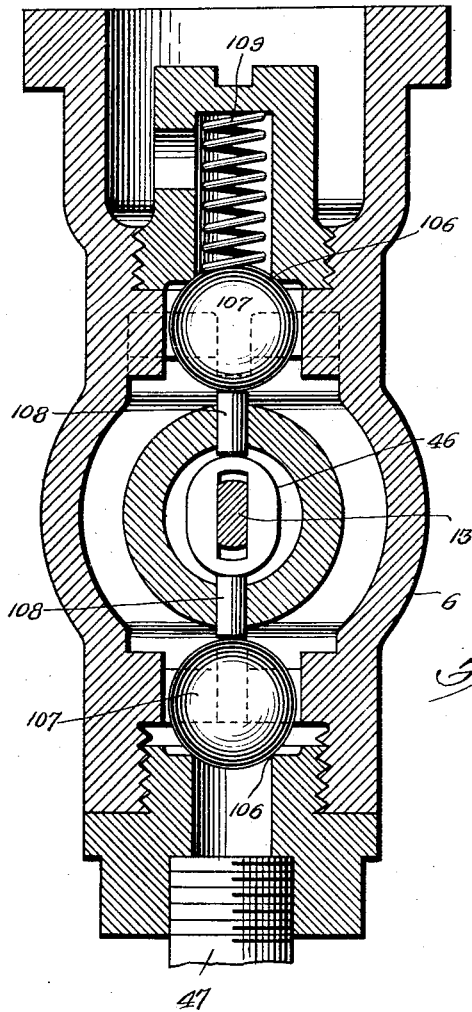
Figs. 8 to 11 are detail views of the manually operable inlet valve controlling the flow of fuel from the reservoir to the measuring container.
Figure 9:
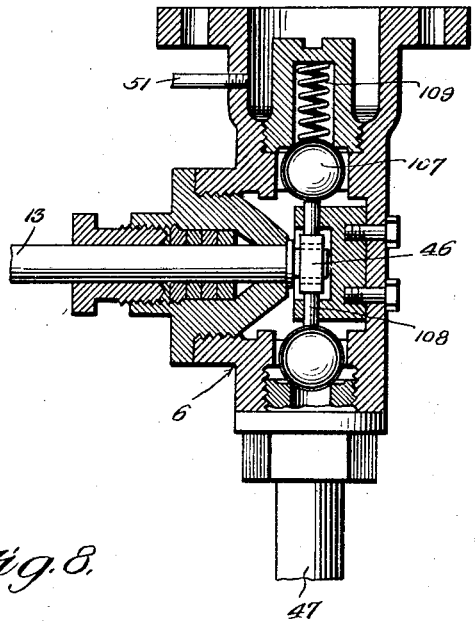
Figure 11:
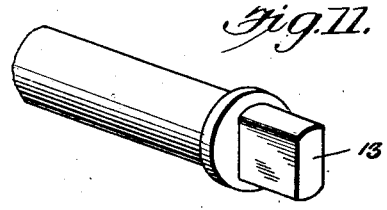
Figure 10:
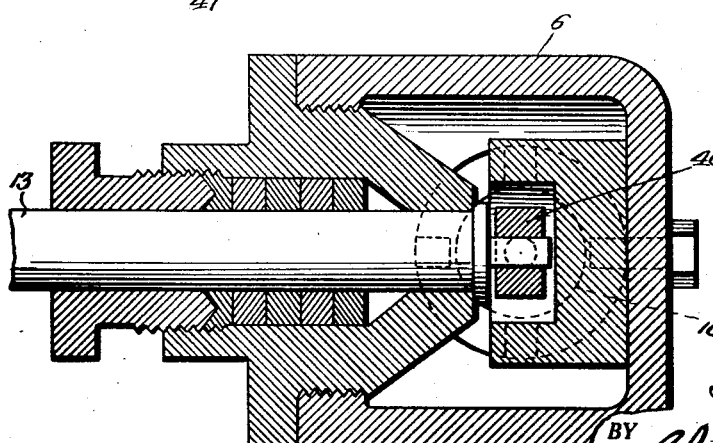
Figure 12:
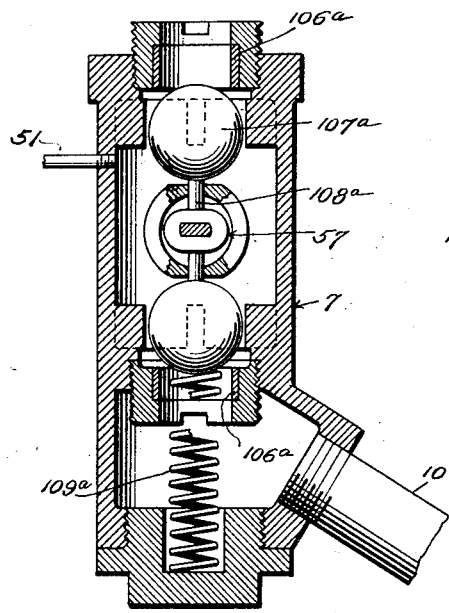
Figs. 12 and 13 are sectional detail views of the outlet valve for the measuring container.
Figure 13:
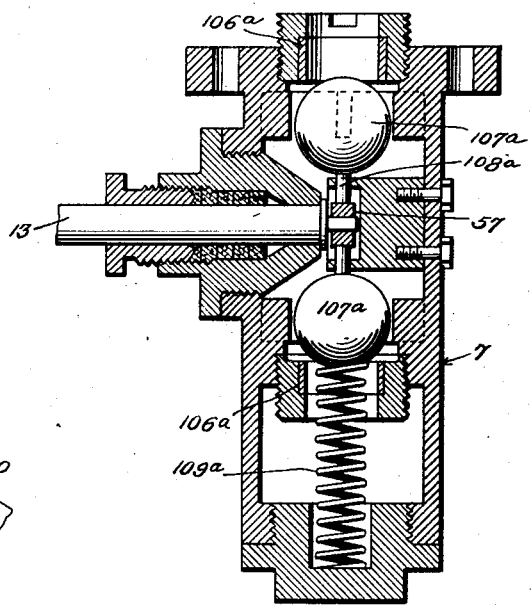

As illustrated in Figure 1, the main reservoir, preferably an underground tank 20, is filled with the liquid to be dispensed (gasoline, in the present instance), and high pressure air supplied through pipe 21 is passed through a pressure reducing valve 22 from which the air, under reduced pressure, flows through a pipe 23 of said reservoir or tank 20. The air supplied through pipe 21 also flows through a pipe 24 to the lower expanding cylinder or diaphragm 25 of a double cylinder or diaphragm locking device 9 in the upper portion of the housing column 1 (Fig. 2). The expansion of cylinder 25 by the air supplied thereto raises the lever 26 (Figs. 3, 4, and 5), the free end of which has attached thereto a rod 11, whose lower extremity is connected to a latch 12 pivoted to rock about a horizontal axis so that upward movement of the free end of lever 26 raises said latch 12 out of the path of an arm 27 rigidly mounted on the shaft 27a of the operating handle 2. After the air under pressure has been admitted to tank 20, an air vent 28 in the pipe 29, extending from the bottom of reservoir 20 upwardly to the upper expanding cylinder or diaphragm 31 of the locking device 9, is opened so that the liquid or gasoline is forced through said pipe into said expanding cylinder. The interior of said expanding cylinder 31 also communicates with a pipe 30 which extends downwardly through the housing column 1 into the reservoir 20, its lower extremity terminating a short distance above the lower extremity of pipe 29. After the cylinder 31 has been filled with the gasoline, vent 28 is closed. Under these conditions, if the gasoline in tank 20 is depleted or exhausted to a point where the level thereof is below the lower extremity of pipe 30, air passes through said pipe 30 and displaces the gasoline in pipe 29 and upper expanding cylinder 31 so that the pressures in the two cylinders 25, 31, is balanced. This causes the lever 26 to drop and, by means of rod 11, such movement of said lever lowers the latch 12 into the path of arm 27 on the operating handle shaft 27a so that it is impossible for said operating handle to be actuated. These conditions will exist until the tank 20 has been replenished and the air in pipes 29, 30 and upper expansion cylinder 31 relieved through vent 28 by opening the latter as above explained.

Normally, with a proper supply of fuel in tank 20, the operating handle 2 is locked against actuation only by means of coin controlled devices that will be released upon insertion of the proper coin in the slot 33 in a disk 16 on shaft 27a. This slot 33 is protected against rain, snow or sleet by a pivotally mounted cover 32 which may be lifted to permit the insertion of a predetermined coin. It is, of course, necessary in apparatus of the present type, to provide means for preventing fraudulent operation thereof by the insertion of spurious coins. Means must be provided for preventing operation of the apparatus upon the insertion of coins that do not meet the requirements as to size, and, in addition, means must be provided for preventing operation of the apparatus upon the insertion of slugs made of base metal or ferrous slugs. To detect slugs of this last type that may be inserted in slot 33, a permanent magnet 34, pivoted in casing 1 at one side of the disk 16 in which slot 33 is formed, is adapted to be attracted and actuated by such a ferrous slug so as to rock said magnet and cause a portion thereof to be projected into a recess 35 in said coin disk. In this way, said disk is locked against rotation and as said disk is fast on shaft 27a of the operating handle 2, the apparatus can not be operated until the slug has been removed. The location of permanent magnet 34 is such that practically no movement of the coin disk is permitted, so that the slug can be easily removed from the slot 33.

If a coin of the proper metal and of the proper dimensions is inserted in slot 33, disk 16 can be turned by movement of the operating lever 2, carrying with it said coin. This coin, upon initial rotation of disk 16 by the operating handle, engages one end of a plunger 36 whose opposite end is adapted to rock a lever 37 pivoted in arms 40 of a bracket mounted on a shaft 19 whose center of rotation is disposed at right angles to the pivotal center of said lever 37. Pivoted on the interior of the casing is a stop 39 normally positioned by gravity in the path of the arm 27 and formed on said stop is a lug 38 which is normally located to one side of the free end of lever 37. However, when the coin inserted in slot 33 is of the proper thickness, plunger 36 rocks lever 37 on its axis so as to position it in the same plane as lug 38. After this movement of lever 37 has taken place continued rotation of coin disk 16 brings the periphery of the coin carried thereby into engagement with a lever 17 pivoted on the shaft 19 which carries the lever supporting bracket 40. Assuming the coin to be of the proper diameter, shaft 19 is rocked and this rocking movement of shaft 19 will rock bracket 40 and lever 37 so as to move stop 39 out of its normal position and out of the path of arm 27 on the shaft of operating handle 2. By thus removing stop 39 out of the path of arm 27, the operating handle is permitted that degree of movement which is required to actuate the valves controlling the flow of fuel to and from the measuring container of the apparatus. After the coin carried by the coin disk 16 passes the lever 17, further rotation of the operating handle 2 and the coin disk in the same direction permits the coin to fall out of slot 33 in the coin disk, dropping into the lower part of column 1 where a suitable receptacle for the coins may be placed.

With the coin detecting devices thus described, it will be seen that if a coin not of the proper metal is inserted in the device, no movement of the operating handle 2 at all is permitted. A coin thicker than the required coin can not, of course, be inserted, and if the coin inserted is not thick enough, then the plunger 36 will not be moved at all, or certainly not the distance that is required to rock lever 37 on its center of rotation so as to position the free end of that lever in alinement with lug 38 of locking stop 39. Again, if the inserted coin is not of the proper diameter, even though it might be of required thickness, then the proper position of lever 37 by plunger 36 will be inconsequential because the diameter of the inserted coin will not be such as to rock lever 19 together with bracket 40 and lever 37, so as to remove the stop 39 out of the path of arm 27 on the shaft of the operating handle. In this way, it is absolutely necessary that the coin be of the proper metal, the proper diameter, and the proper thickness, before the operating connections for the fuel controlling valves can be released for operation of the apparatus and deliver the fuel therefrom.

For controlling the flow of the fuel from reservoir 20 to the measuring container 4, there is a valve interposed in pipe 47 which connects said reservoir and container. This valve consists of a casing 6 having seats 106 therein adapted to be closed by ball valves 107 which are forced into closed position by a cam 46 carried on the valve stem 13, plungers 108 being interposed between said ball valves and said cam 46 for seating the latter. The pressure of fuel in pipe 47 will elevate and unseat the lower ball valve 107, while a spring 109 within the valve casing will depress and unseat the upper valve 107. Mounted on valve stem 13 at the exterior of casing 6 is an arm 45 to which is attached a rod 44, extending downwardly through the housing column 1 so that its lower extremity is positioned in the path of a pin 43 carried on an arm 43a mounted on the shaft 27a of the operating handle 2. As will be understood, rotation of operating handle 2 to the proper extent will elevate rod 44 and rotate valve stem 13 and cam 46 so as to permit unseating of the valves 107. The valve controlling the outlet port of the measuring container 4 is of similar construction and operates in substantially the same manner. This outlet valve comprises a casing 7 and a valve stem 13a on which is mounted a cam member 57 engaging plungers 108a for forcing the ball valves 107a against their seats 106a in the valve casing. In this instance, the pressure of the fuel is against the upper ball valve 107a while the lower ball valve is adapted to be unseated by a spring 109a. At its outer extremity, the valve stem 108a has mounted thereon an arm 56 to which is attached a rod 55 whose lower extremity is located in the path of the pin 43 when the operating handle 2 is rotated in the direction opposite to that in which it is rotated for engagement with the valve 44 of the inlet valve. In other words, after the operating handle has been unlocked as described in connection with the coin detecting devices, rotation of the handle in one direction will open the inlet valve in pipe 47 so that the pressure in reservoir 20 will flow through said pipe into the measuring container 4 and, by means to be later described, after a predetermined quantity of fuel is delivered to said container, such supply of fuel is automatically cut off and can not, in any way, be continued by the person operating the device. After this predetermined quantity of fuel has been delivered into the container 4, the purchaser then rotates the operating handle 2 in the opposite direction, bringing it into engagement with the lower extremity of valve rod 55, whereupon the outlet valve is opened and the fuel then in container 4 escapes through the outlet pipe 10. By requiring reverse movements of the operating handle and disengagement thereof from the inlet valve rod in order to actuate the outlet valve rod, it is impossible to operate both of said valves at the same time so as to obtain from the apparatus more fuel than is supposed to be delivered according to the value of the coin to be used in the apparatus. The lower extremities of rods 44 and 55 are formed with offset portions 110 that are engaged by the pin 43 on arm 43a, during movement of said pin in a downward direction, so that it is impossible to first elevate one of said rods and open the valve control thereby and leave said valve open and reverse the movement of the operating handle to open the other valve.

Figure 14:
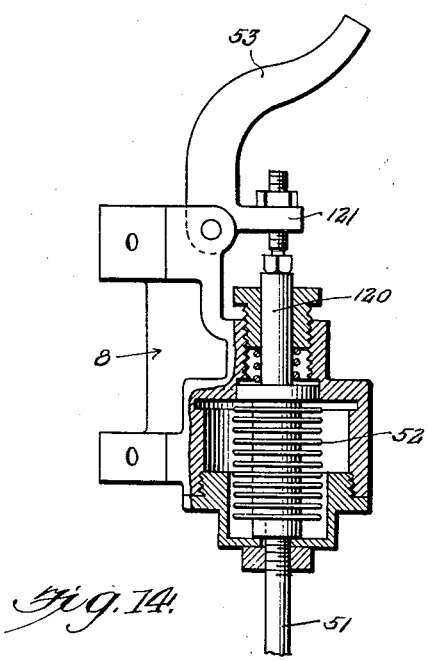
Fig. 14 is a detail view, partly in section, of a locking device for locking the inlet valve against operation after it has been opened and until a predetermined quantity of fuel has been delivered from the reservoir to the measuring container.
Figure 26:
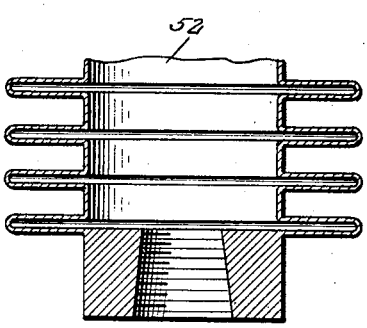
Figure 77:
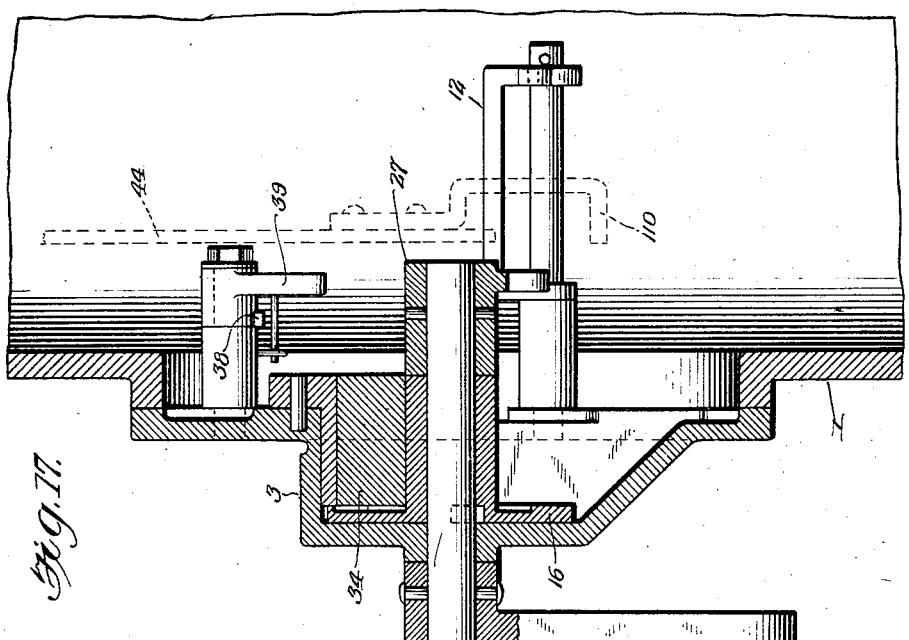
Figure 78:
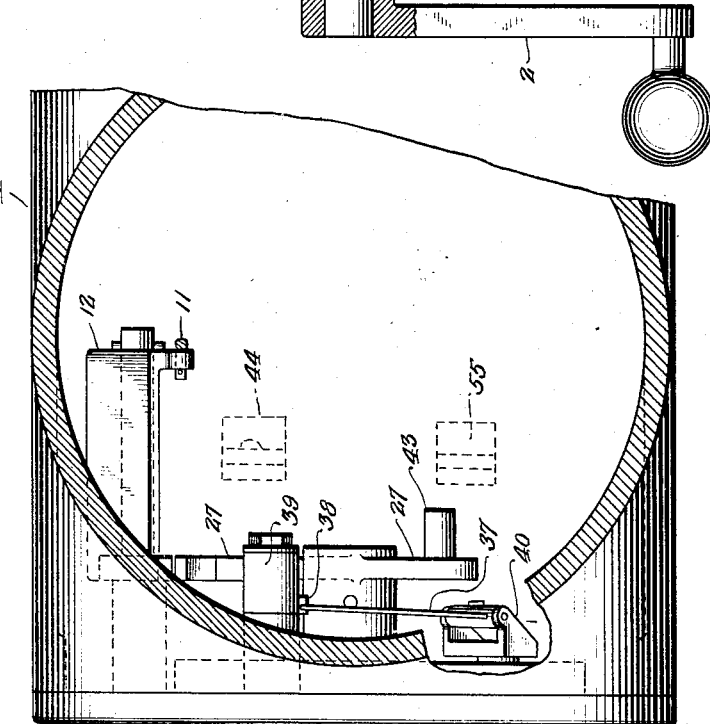

By reason of the fact that it is necessary to reverse the direction of movement of operating handle 2 to open the outlet valve after the inlet valve has been opened to admit fuel into the measuring container 4, means are provided for locking the inlet valves 107 against closing movement after they have been opened and until the proper quantity of fuel has passed into said container. This is accomplished by having within container 4 a float 48 adjustably secured on a rod 15 extending through a bearing bracket 14 at its upper end and carrying at its lower end a valve 49 adapted to seat against the periphery of a port 50 in the bottom of the container through which fuel passing valve 107 enters said container. Float 48 is guided by an eye 59 at the periphery thereof engaging a guide rod 58 mounted in the bottom of container 4. Communicating with the interior of the chamber between port 50 and the upper valve 107 is a pipe 51 which extends to and communicates with the interior of an expansible cylinder 52 enclosed within a casing 8. This expansible cylinder or diaphragm 52 is provided with a plunger 120 that bears against a lug 121 formed on a pivoted arm 53. In normal position said arm 53 is held in the position shown in Figs. 2, 3, and 14 by the cylinder 52 being distended by fuel within the same. However, when inlet valves 107 are opened, the pressure on the fuel within cylinder 52 is relieved so that the same collapses, so to speak, thereby lowering arm 53 so that it occupies a position in the path of a pin 54 carried on the arm 44 of said inlet valves. At the time this occurs, said arm 44 has been lowered to open said valve and when said arm 53 is thus interposed in the path of said pin 54, it will be impossible for a purchaser operating the apparatus to return arm 44 to its closing position so as to close the inlet valves. Fuel is thus delivered into container 4 and as the level thereof rises, float 48 is elevated until finally the proper volume of fuel has entered the container. At this time, valve 49 will seat against port 50, closing the same, whereupon pressure will build up in the interior of valve 6 and that portion of the passage between said valve and port 50, and as a consequence fuel passing through pipe 51 will also go to pressure within cylinder 52, distending the same so as to return arm 53 to its normal position out of the path of pin 54. The purchaser can then impart a reverse movement to the operating handle 2, carrying this reverse movement far enough to close the inlet valves and open the outlet valves 107a. The fuel within the container 4 will then escape through outlet pipe 10. When the outlet valves 107a are opened, pipe 51a, communicating therewith, and forming a branch of pipe 51, will relieve the pressure on the fuel in the passage between inlet valves 107 and valve 49, so that the latter will recede from its seat around port 50. After all the fuel has passed from the container 4, the operating handle is restored to its original position so that all of the parts are then in normal position, ready for a second operation of the apparatus upon the deposit of another coin.

To regulate the quantity of fuel that must enter container 4, before valve 49 will close, float 48 is threaded on rod 15 and at its upper end said rod is provided with a knob 60, whereby it may be rotated to adjust the float axially of the container. This adjustment of the float is necessary in view of the fluctuating prices of the gasoline or other fuel being sold from the apparatus. To hold rod 15 against accidental rotation, a spring 61 mounted on the supporting bracket 14 has its free end in engagement with knob 60. To permit adjustment of the float, the cap 62 of the container is provided with a hand hold that may be closed by a cover 63, locked in place with any suitable securing means. Graduations are also placed on the container 4 to facilitate regulating the position of float 48 in accordance with the current price of gasoline and the value of the coin used in the apparatus.

What I claim is:

1. In a gasoline vending machine, the combination of a visible dispensing container having valve controlled inlet and outlet openings, a reservoir in which fuel is stored under pressure, said reservoir being connected to said inlet opening, an operating lever or handle for actuating the inlet and outlet valves, and means operable by depletion of gasoline in the reservoir for locking said lever against operation.

2. In a gasoline vending machine, the combination of a visible dispensing container having valve controlled inlet and outlet openings, a reservoir in which fuel is stored under pressure, said reservoir being connected to said inlet opening, an operating lever or handle for actuating the inlet and outlet valves, a stop adapted to be positioned to engage said lever upon depletion of gasoline to a predetermined extent in said reservoir, and means operable by pressure on the gasoline in said tank to hold said stop out of engagement with said lever until the gasoline is depleted to said predetermined extent.

3. In a gasoline vending machine, the combination of a reservoir in which gasoline under pressure is stored, a visible container to which gasoline due to be dispensed is supplied from said reservoir, a valve controlling said supply, and means operable by depletion of the gasoline in the reservoir for locking said valve closed.

4. In a gasoline vending machine, the combination of a reservoir in which gasoline under pressure is stored, a visible container to which gasoline due to be dispensed is supplied from said reservoir, a valve controlling said supply, an operating handle or lever for actuating said valve, and means normally disengaged from said handle but movable into position to lock said handle against operation upon depletion of gasoline in the reservoir.

5. In a gasoline vending machine, the combination of a reservoir in which gasoline under pressure is stored, a visible container to which gasoline due to be dispensed is supplied from said reservoir, a valve controlling said supply, an operating lever for operating said valve, a stop, means for normally supporting said stop out of the path of said lever, and means operable upon depletion of gasoline in said reservoir for rendering said stop supporting means inoperative, whereby said stop will be free to assume a position to engage said operating lever.

6. In a gasoline vending machine, a reservoir for the gasoline, a visible dispensing container, means for placing the gasoline in the reservoir under pressure to force the same into said container, a valve controlling the flow of gasoline from said reservoir to said container, an operating lever for said valve, a pivoted stop, opposed diaphragms, a lever connected to said stop engaging said diaphragms and adapted to be rocked on its pivotal center by expansion or contraction of the same, means for normally exerting unequal pressures on said diaphragms to hold said stop lever in operating position and hold said stop out of engagement with the operating lever, and means for altering pressure in one of said diaphragms to rock said stop lever and position said stop in the path of said operating lever.

7. In a gasoline vending machine, a reservoir for the gasoline, a visible dispensing container, means for placing the gasoline in the reservoir under pressure to force the same into said container, a valve controlling the flow of gasoline from said reservoir to said container, an operating lever for said valve, a pivoted stop, opposed diaphragms, a lever connected to said stop engaging said diaphragms and adapted to be rocked on its pivotal center by expansion or contraction of the said diaphragms, one of said diaphragms being in communication with said reservoir and adapted to normally be filled with gasoline under pressure and the other diaphragm being adapted to be filled with a fluid under greater pressure than the gasoline in the first diaphragm, and connections for displacing the gasoline from said first diaphragm with fluid under the same pressure as that in the second diaphragm upon depletion of gasoline in the reservoir.

8. In a gasoline vending machine, the combination of a reservoir, a dispensing container communicating with said reservoir and having inlet and outlet ports, valves controlling the flow of gasoline through said ports, an operating lever for actuating said valves, and pressure controlled devices for locking said lever against movement after the inlet valve is opened and until a predetermined quantity of gasoline has entered said container.

9. In a gasoline vending machine, the combination of a reservoir, a dispensing container communicating with said reservoir and having inlet and outlet ports, valves controlling the flow of gasoline through said ports, an operating lever for actuating said valves, a normally distended diaphragm, a stop normally supported in inoperative position by said diaphragm, and means operable upon opening the said inlet valve to relieve the pressure on said diaphragm and render said stop operative to lock the operating lever against movement.

10. In a gasoline vending machine, the combination of a reservoir, a dispensing container communicating with said reservoir and having inlet and outlet ports, valves controlling the flow of gasoline through said ports, an operating lever for actuating said valves, a normally distended diaphragm, a stop normally supported in inoperative position by said diaphragm, means operable upon opening the said inlet valve to relieve pressure on said diaphragm and render said stop operative to lock the operating lever against further movement, and means controlled by the flow of gasoline into said container for subsequently distending said diaphragm and returning said stop to its normal inoperative position.

11. In a gasoline vending machine, the combination of a reservoir, a dispensing container communicating with said reservoir and having inlet and outlet ports, valves controlling the flow of gasoline through said ports, an operating lever for actuating said valves, a normally distended diaphragm, a stop normally supported in inoperative position by said diaphragm, means operable upon opening of said inlet valve to relieve the pressure on said diaphragm and render said stop operative to lock the operating lever against movement, a float in said container, and means controlled by said float for restoring said diaphragm and stop to normalcy.

12. In a gasoline vending machine, the combination of a dispensing container having inlet and outlet ports, a float in said container, a valve movable with said float for opening and closing the inlet port, manually operating valves also controlling the flow of gasoline through said ports, and pressure responsive means controlled by the opening of said valves for the inlet for locking the manually controlled inlet valve in open position while said float controlled valve is open and for releasing said manually controlled inlet valve upon closing of the float controlled valve.

13. In a gasoline vending machine, the combination of a visible dispensing container having inlet and outlet ports, a valve for each of said ports, an operating lever for actuating said valves, and means locking said lever against movement after the inlet valve has been opened and until a predetermined quantity of gasoline has been delivered to said container.

14. In a gasoline vending machine, the combination of a visible dispensing container having inlet and outlet ports, a valve for each of said ports, an operating lever movable in one direction to open the inlet portion and in the opposite direction to close said inlet and open the outlet, and means for locking said lever against reverse movement after the inlet valve has been opened and until a predetermined quantity of gasoline has been delivered to said container.

15. In a gasoline vending machine, the combination of a container from which the gasoline is to be dispensed, said container having inlet and outlet ports and said inlet port having a pressure chamber associated therewith, valves for said ports, a lever for actuating said valves, and means responsive to pressure in said chamber for locking said lever against operation after said inlet valve has been opened and until a predetermined quantity of gasoline has entered said container.

JACOB ROSS GROVE.